Figure 1:
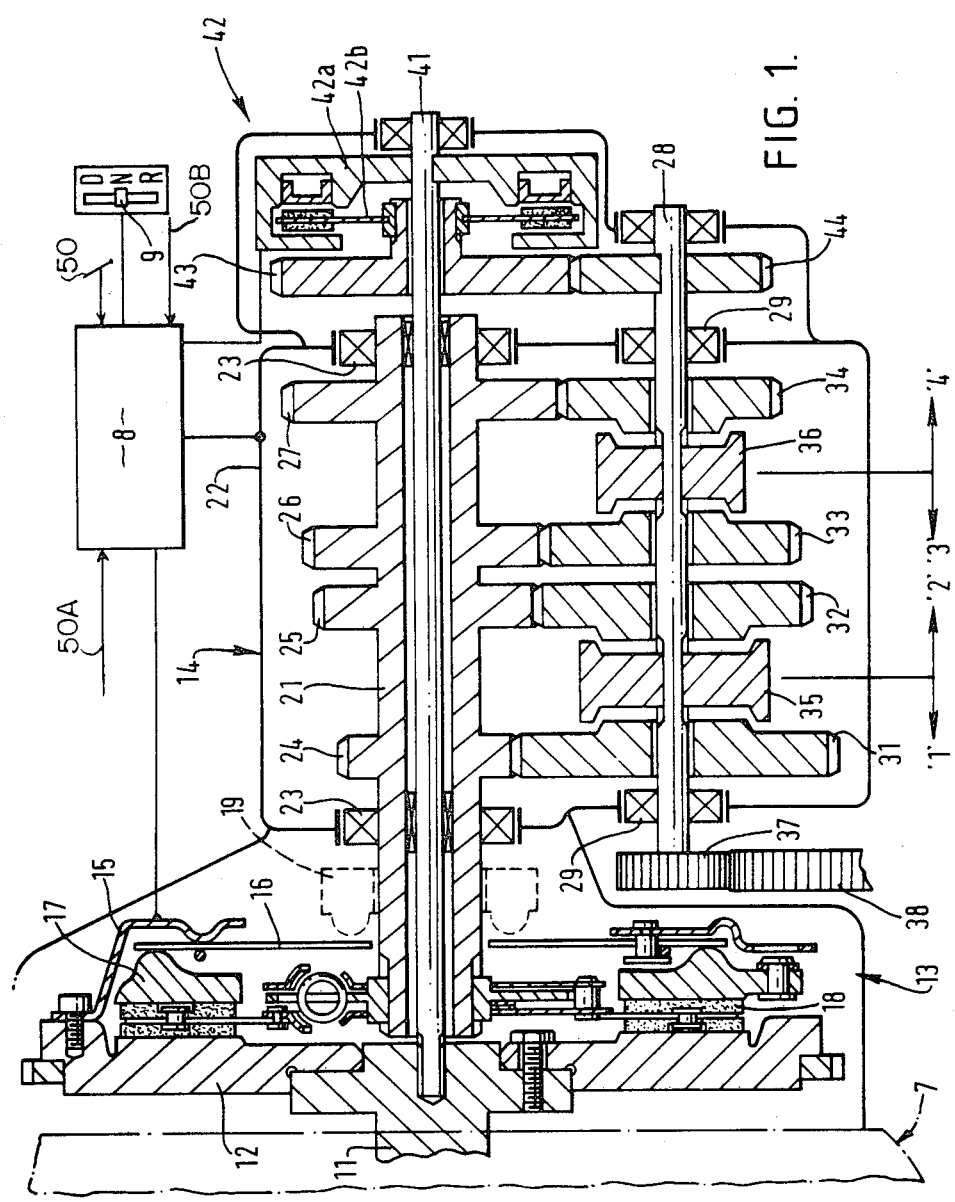

United States Patent [19]

Webster et al.

[11] Patent Number: 4,544,057
[45] Date of Patent: Oct. 1, 1985

[54] ROTARY TRANSMISSION

[75] Inventors: Henry G. Webster, Kenilworth; Wilfred N. Bainbridge, Overthorpe, Nr. Banbury, both of England

[73] Assignee: Automotive Products plc, Leamington Spa, England

[21] Appl. No.: 463,034

[22] Filed: Feb. 1, 1983

[30] Foreign Application Priority Data

Feb. 5, 1982 [GB] United Kingdom ............... 8203394

[51] Int. Cl.⁴ .................. B60K 41/28; F16H 3/08
[52] U.S. Cl. .................. 192/0.076; 192/0.092; 192/87.14; 74/359
[58] Field of Search ............... 192/0.052, 0.076, 0.075, 192/0.092, 3.61, 3.62, 48.9, 87.11, 87.12, 87.14, 87.15; 74/330, 331, 359, 329, 333, 363

[56] References Cited

U.S. PATENT DOCUMENTS

| 3,273,679 | 9/1966 | Uher | 192/0.052 |
| 4,294,341 | 10/1981 | Swart | 192/0.076 |

FOREIGN PATENT DOCUMENTS

| 1505402 | 4/1970 | Fed. Rep. of Germany | ... 192/0.052 |
| 449540 | 6/1936 | United Kingdom . | |
| 510486 | 9/1938 | United Kingdom . | |
| 632861 | 12/1949 | United Kingdom . | |
| 644836 | 10/1950 | United Kingdom . | |
| 1225448 | 3/1971 | United Kingdom . | |
| 2064028 | 6/1981 | United Kingdom | 74/329 |
| 2070158 | 9/1981 | United Kingdom | 74/359 |
| 680923 | 9/1979 | U.S.S.R. | 74/359 |

Primary Examiner—George H. Krizmanich
Attorney, Agent, or Firm—Kemon & Estabrook

[57] ABSTRACT

The transmission is intended to effect synchronism between the speed of an engine and the speed of a transmission input shaft. An engine drive clutch and gearbox combination is provided which comprises automatic change speed to engage and disengage the drive clutch and to select a required gearbox ratio. A further clutch is also provided which is responsive to said change speed to control engine speed during a ratio change with the drive clutch disengaged. The further clutch reacts against the output shaft of the gearbox to synchronize engine speed with the speed of the transmission input shaft during the ratio change and enables drive to be transmitted between the engine and output shaft with the drive clutch disengaged.

11 Claims, 2 Drawing Figures

ROTARY TRANSMISSION

This invention relates to automatically controlled rotary transmissions particularly, though not exclusively, suitable for motor vehicles.

In motor vehicles such transmissions have hitherto been fundamentally different from the manual transmission counterparts both in design and operation. To satisfy public demand and maximise sales vehicle manufacturers are anxious to offer both manual and fully automatic versions of a particular model. Automatic transmissions are almost universally more bulky than the manual transmissions they are intended to replace and this imposes severe constraints on the initial vechile design parameters. Indeed, it has proved increasingly difficult to provide fully automatic transmissions for the transverse-engined front-wheel-drive vehicles which are becoming more prevalent.

Automatic transmissions are less fuel efficient than the equivalent manual transmission because, for example, they incorporate torque converters for drive take-up from rest. They frequently have a lower number of speed ratios which affects not only their comparative fuel economy, but also the comparative vehicle performance.

Automatic transmissions are in general less well understood than manual transmissions and thus can pose service and reliability problems. Furthermore, the vehicle manufacturers spares inventory is increased.

An automatic transmission option is usually an expensive extra and thus can add a considerable percentage to the cost of small vehicles.

A fully automatically control transmission which uses the same clutch and gearbox as an equivalent manual transmission would be an acceptable solution to the abovementioned problems but although such control has been proposed it has never been wholly successful due to the problems of clutch engagement whilst retaining full driver command of the vehicle engine.

Examination of the problem of clutch control has shown that the clutch is required to perform two functions on engagement, firstly initial engagement to synchronise engine speed and transmission input speed and secondly, final engagement to transmit drive. In a manually controlled transmission the experienced vehicle driver judges the rate of clutch engagement to achieve a perfect ratio change under all conditions of speed and load but this has proved extremely difficult with fully automatic control.

Solutions have been proposed which isolate the vehicle driver from the engine throttle during a ratio change so easing the conditions for clutch engagement. These have not proved acceptable because the period of isolation, although very short, has proved to long for the driver who requires instant throttle response. British Pat. Nos. 1,225,448, 644,836, 632,861, 510,486 and 449,540 are examples of transmission in which clutches reacting against a transmission output shaft are used to assist synchronism of gears or ratio selectors. However, the aforementioned patents are not concerned with achieving synchronism between the engine and the input shaft of the transmission.

An object of the present invention is to provide an improved transmission which will substantially synchronise engine speed with transmission input shaft speed and which will utilise some of the energy absorbed by the brake.

According to the present invention there is provided a motor vehicle engine, drive clutch and gearbox combination comprising automatic change speed means to engage and disengage the drive clutch and to select a required gearbox speed ratio, and a further clutch responsive to said change speed means to control the engine speed during a speed ratio change with the drive clutch disengaged to substantially synchronise engine speed with the speed of a transmission input shaft speed, said further clutch being arranged to react against the transmission output shaft to enable drive to be transmitted between the engine and the transmission output shaft during the speed ratio change with the drive clutch disengaged.

Such an arrangement gives a degree of drive to the vehicle driving wheels whilst the drive clutch is disengaged thereby utilising some of the energy absorbed by the brake to generate additional driving effort. The aforesaid magnetic transmission is not arranged in that way as the first clutch does not release during engine braking by the further clutch and, in the British Patents recited above, drive to the output shaft from the engine is not maintained during gear changes.

Preferably, the drive clutch comprises a driving member drivably connected to the engine and a driven member drivably connected to the transmission input shaft, and the further clutch comprises a driving member drivably connected to the engine and a driven member drivably connected to the transmission output shaft.

The further clutch may be arranged at the opposite side of the gearbox to said drive clutch. In such a case the clutches may be coaxial and a drive shaft for transmitting drive from the engine to said further clutch may extend coaxially through the gear wheels driven by said drive clutch. Such an arrangement is particularly compact and enables the basic manual-type gearbox to be converted easily to an automatic mode.

The driven member of said further clutch may transmit drive to the transmission output shaft through a two wheel gear train which may provide an overdrive ratio.

Figure 2:
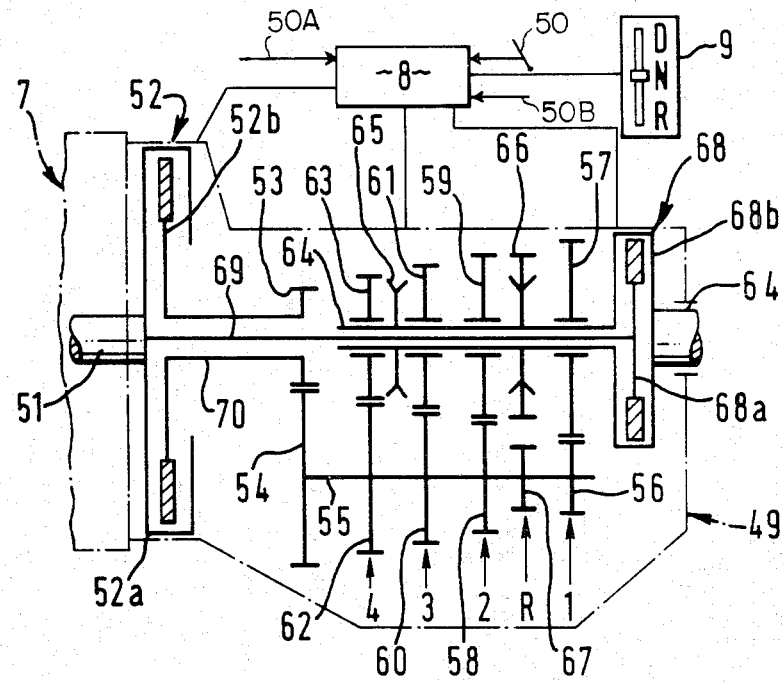

The invention will now be described by way of example only with reference to the accompanying drawings in which:

FIG. 1 is a cross section through one form of transmission in accordance with the invention; and FIG. 2 is a schematic cross section of an alternative form of transmission in accordance with the invention.

With reference to FIG. 1 there is shown an engine 7 having a crankshaft 11 and flywheel 12 coupled through a conventional single dry plate clutch 13 to a manual change type gearbox 14 for a front-wheel-drive vehicle. The clutch 13 has the usual cover plate 15 bolted to the flywheel 12, diaphragm spring 16, pressure plate 17 and driven plate 18. A clutch release bearing 19 is shown in dotted outline.

The clutch driven plate 18 is splined to a transmission input shaft 21 which is supported in the gearbox casing 22 by bearings 23. Gear wheels 24, 25, 26 and 27 respectively for 1st, 2nd, 3rd and 4th speed ratios are fast for rotation with the input shaft 21.

A transmission output shaft 28 is supported in the casing 22 by bearings 29 and has gear wheels 31, 32, 33 and 34 journalled thereon, the wheels 31-34 being respectively in constant mesh with wheels 24-27.

Synchroniser assemblies 35 and 36 are fast for rotation with the output shaft 28 and are shiftable in response to movement of a gear shift lever to connect one of the gears 31-34 to the shaft 28. Such synchroniser assemblies 35 and 36 are well known in manual change transmission art and will not be further described here.

The shaft 28 is connected through gears 37, 38 to a differential gear and hence to the vehicle driving wheels.

A reverse speed ratio (not shown) is provided in any conventional manner suitable.

As described so far, the transmission is a conventional four speed, manual change arrangement with gear wheels in constant mesh and suitable for a front wheel drive vehicle.

The transmission may be modified to incorporate the invention in the following way:

The input shaft 21 is bored to take an additional driving shaft 41 fast for rotation with the engine crankshaft 11. The shaft 41 is connectable through an additional clutch 42, which may be hydraulically actuatable as shown, to a gear train 43, 44. The clutch 42 comprises driving plate 42a drivably connected to shaft 41 and a driven plate 42b drivably connected to the driving gear 43.

The driving gear 43 is journalled on the driving shaft 41 and the driven gear 44 is mounted on and fast for rotation with the output shaft 28. The gear train 43, 44 provides a fifth, higher, speed ratio for the transmission.

The clutch 42 and gear wheels 43, 44 are mounted at the side of the transmission remote from the main drive clutch 13, the arrangement and operation of the existing transmission components being unchanged.

Engagement of the clutch 42 by hydraulic pressure is envisaged, a hydraulic pump (not shown) being provided in the transmission and preferably driven at engine speed from the drive shaft 41. An automatic change speed controller 8 is provided to effect operation of the synchroniser assemblies 35 and 36 and engagement of the clutches 13 and 42 in a predetermined manner as will be described.

The controller 8 is preferably an electro-hydraulic device responsive to command signals such as opening of an engine throttle indicated at 50, vehicle road speed indicated at 50B etc. in the manner of known automatic controllers of fully automatic vehicle transmission. It is intended that the transmission be driver controlled by the use of a conventional automatic transmission selector lever 9 having the usual DRIVE, NEUTRAL and REVERSE positions (D, N and R in FIG. 1).

Operation of the transmission is as follows:

With the vehicle engine running the driver shifts the selector lever 9 to DRIVE and the automatic controller causes synchroniser assembly 35 to select 1st speed ratio almost simultaneously, the clutch 13 being released.

Depression of the vehicle accelerator pedal causes the controller to effect progressive engagement of the drive clutch 13 until the vehicle is rolling and the clutch fully engaged. The rate of clutch engagement will be dependent on for example throttle opening, vehicle load etc.

Gear trains 44, 43 and the driven member of clutch 42 will be driven idly at the speed of output shaft 28 whilst the driving member of clutch 42 will be driven at engine speed by shaft 41.

As the vehicle road speed increases the controller 8 will cause a speed ratio upchange to take place which includes the necessary steps of automatically disengaging the drive clutch 13, causing the gear shaft lever 9 to select the required speed ratio and re-engaging the drive clutch in the manner of a ratio change of a manual change transmission.

During a speed ratio unchange engine speed must fall to match the input speed of the newly selected transmission speed ratio. In a conventional transmission the drive clutch synchronises engine and transmission input speed at initial engagement.

In the present transmission the clutch 42 is engaged whilst the next required speed ratio is being selected to bring the engine to approximately synchronous speed with the transmission. The clutch 42 acts as a brake reacting against the output shaft 28 to provide a degree of driving effort during the ratio change.

The conditions for clutch re-engagement are greatly simplified, very fast and smooth clutch engagement being possible since the engine flywheel and clutch driven plate are pre-synchronised.

The controller requires an additional input 50A for engine speed, this could be of the type used to sense transmission output (or road) speed.

Using the arrangement described not only conserves some of the energy with the transmission instead of dissipating all the braking energy as heat but also provides a degree of driving effort during the short period in which the main drive clutch is disengaged.

Further speed ratio changes are made in the same manner as described above.

When fourth speed is selected simultaneous disengagement of clutch 13 and engagement of clutch 42 gives a fifth speed ratio through the gear train 43, 44. The use of a friction clutch to engage overdrive provides a smooth ratio change without baulking associated with synchromesh components. Such a ratio would advantageously be numerically low, giving an overdrive ratio for high speed motoring.

For speed ratio downchanges the engine speed must rise to match the newly selected transmission input speed. Where the throttle is applied during downchanges the controller will allow engine speed to rise to synchronous speed and then momentarily engage the engine brake to hold engine speed for clutch re-engagement.

Throttle off downchanges will require the clutch to synchronise engine and gearbox speed.

However, since the transmitted torque between engine and gearbox is very low and rapid change speed not of the essence such synchronisation is well within the capacity of the clutch 42.

A subsidiary advantage of the use of an engine brake is that clutch driven plate life may be prolonged since the energy input into the driven plate during the worst ratio change, i.e. a full throttle upchange is reduced. This is because the clutch 42 transfers to the output shaft 28 some of that energy that would otherwise be absorbed by the clutch in reducing engine speed to synchronous speed.

One further advantage of the invention is that it is relatively straight forward to convert a vehicle for which both transmission are specified from manual to fully automatic mode according to consumer demand.

As an alternative, the conventional manual change transmission described with reference to the accompanying FIG. 1 could be modified so that the fourth gear train 27, 34 were adapted to be driven by the clutch 42. In this case gear wheel 34 would be fast for rotation on the output shaft 28 and gear wheel 27 journalled on the drive shaft 41 for drive through the clutch 42. Such an arrangement would give a fully automatic transmission of very little extra length over the manual change transmission from which it is derived.

FIG. 2 of the accompanying drawings shows a five speed in-line transmission 49 having the same operating principle of the transmission already described but suitable for front engined rear wheel drive vehicles.

The crankshaft 51 drives through a main drive clutch 52 an input shaft 70 and gear train 53, 54 to a layshaft 55. The clutch 52 comprises driving and driven members 52a and 52b respectively.

Trains of gear wheels 56, 57; 58, 59; 60, 61; 62, 63 for the first to fourth speed ratios are provided between the layshaft 55 and an output shaft 64. The driving gear wheels 56, 58, 60, 61 are fast for rotation with the layshaft whilst the driven gear wheels 57, 59, 61 and 63 are journalled on the output shaft and selectively connectable thereto by synchroniser assemblies 55, 66.

Reverse speed ratio is provided by a gear wheel 67 fast on the layshaft and a gear profile formed on the synchroniser assembly 66. A shiftable laygear (not shown) connects the wheel 67 and assembly 66 to reverse rotation of the drive in a known manner.

An engine brake is provided by clutch 68 connected to the crankshaft by driving shaft 69, and engageable with the output shaft 64 which forms a housing for the clutch. The clutch 68 comprises driving and driven members 68a and 68b. A fifth speed ratio is provided by direct drive through the clutch 68 from the driving shaft 69 to the output shaft 64.

Operation of the transmission is as described for the previous embodiment.

What we claim as our invention and desire to secure by Letters Patent in the United States is:

1. A motor vehicle engine and transmission combination comprising a drive clutch, an input shaft for the transmission to which drive is transmitted from the engine by the drive clutch, an output shaft for the transmission, a plurality of gear trains which provide a series of increasing drive ratios between the input shaft and the output shaft, each gear train comprising a gear wheel on the input shaft and a gear wheel selectively drivably connectable to the output shaft by selector means, automatic change speed means to operate said selectors, and a further clutch having a driving member drivably connected to said engine, said further clutch being responsive to said change speed means to control the engine speed during a ratio change between one said ratio and the next higher ratio with said drive clutch disengaged to substantially synchronize engine speed with the speed of said transmission input shaft speed, said further clutch having a driven member drivably connected to the transmission output shaft to enable drive to be transmitted between the engine and the transmission output shaft during the speed ratio change with the drive clutch disengaged.

2. A combination according to claim 1, in which the drive clutch comprises a driving member drivably connected to the engine and a driven member drivably connected to the transmission input shaft.

3. A combination according to claim 2, in which said further clutch is arranged at the opposite side of gearbox to said drive clutch.

4. A combination according to claim 3, in which said clutches are co-axial.

5. A combination according to claim 4, in which a drive shaft for transmitting drive from the engine to said further clutch extends through the gear wheels driven by said drive clutch.

6. A combination according to claim 5, in which the driven member of said further clutch is drivably connected to the transmission output shaft through a two wheel gear train.

7. A combination accordinfg to claim 6, in which the driving gear of the two wheel train is journalled on said drive shaft and the driven gear is fast for rotation with said transmission output shaft.

8. A combination according to claim 7 in which the relative sizes of the two gear wheels of the two wheel gear train connecting the driven member of the further clutch to the output shaft are selected to provide an overdrive ratio, said further clutch acting as a drive clutch for the train.

9. A combination according to claim 4 characterised in which the transmission output shaft is parallel with the common axis of the clutches.

10. A combination according to claim 4 in which the transmission output shaft is coaxial with said clutches.

11. A motor vehicle engine and transmission comprising a drive clutch, an input shaft for the transmission to which drive is transmitted from the engine by the drive clutch, an output shaft for the transmission, a plurality of gear trains which provide a series of increasing drive ratios between the input shaft and the output shaft, each gear train comprising a gear wheel on the input shaft and a gear wheel selectively drivably connectable to the output shaft by selector means, automatic change speed means to operate said selectors, and a further clutch responsive to said change speed means to control the engine speed during a ratio change between one said ratio and the next higher ratio with said one clutch disengaged to substantially synchronise engine speed with the speed of said transmission input shaft, said further clutch including a driven member drivably connected to the engine and a driven member drivably connected to said output shaft by a two wheel gear train which provides a further drive ratio to enable drive to be transmitted between the engine and the transmission output shaft during the speed ratio change with the drive clutch disengaged said selector means being arranged to select said increasing drive ratios one after the other in ascending or decending order and to select said further drive ratio at one end of the range of said increasing drive ratios.

* * * * *